United States Patent
Yates

Patent Number: 6,017,407
Date of Patent: Jan. 25, 2000

[54] METHOD OF MANUFACTURING A CUSHION ARTICLE

[76] Inventor: Paul M. Yates, 5814 Briar Tree Dr., LaCanada, Calif. 91011

[21] Appl. No.: 08/955,585

[22] Filed: Oct. 22, 1997

[51] Int. Cl.⁷ .................................................. B29C 44/12
[52] U.S. Cl. .................. 156/221; 156/145; 156/290; 156/308.4; 264/155; 264/257; 264/263; 264/266; 264/267
[58] Field of Search .................................... 156/145, 290, 156/308.4, 221; 264/154, 155, 257, 263, 267, 266

[56] References Cited

U.S. PATENT DOCUMENTS

| | | | |
|---|---|---|---|
| 4,195,639 | 4/1980 | Lee | 128/481 |
| 4,332,634 | 6/1982 | Aperavich | 156/145 |
| 4,701,230 | 10/1987 | Loi | 156/145 |
| 4,829,644 | 5/1989 | Kondo et al. | 29/91.1 |
| 4,831,697 | 5/1989 | Urai | 29/91.1 |
| 4,860,415 | 8/1989 | Witzke | 29/91.1 |
| 4,955,909 | 9/1990 | Ersek et al. | 623/11 |
| 5,034,076 | 7/1991 | Masui et al. | 156/79 |
| 5,035,758 | 7/1991 | Degler et al. | 156/61 |
| 5,250,250 | 10/1993 | Gorski | 264/227 |
| 5,340,352 | 8/1994 | Nakanishi et al. | 450/57 |
| 5,435,508 | 7/1995 | Deuitch et al. | 248/118 |
| 5,480,155 | 1/1996 | Molitor et al. | 273/220 |
| 5,486,329 | 1/1996 | Ueki et al. | 264/273 |
| 5,497,789 | 3/1996 | Zook | 128/893 |
| 5,558,829 | 9/1996 | Petrick | 264/263 |
| 5,603,791 | 2/1997 | Weber-Unger et al. | 156/145 |
| 5,695,452 | 12/1997 | Grim et al. | 602/6 |

FOREIGN PATENT DOCUMENTS 63-319113  12/1988  Japan.

*Primary Examiner*—Jan H. Silbaugh
*Assistant Examiner*—Stefan Staicovici
*Attorney, Agent, or Firm*—Walter A. Hackler

[57] ABSTRACT

A cushion article, such as a wrist support or the like, and a method of manufacturing same are provided. The cushion article includes a multiple density, cushioned surface bonded to a molded foam shell. The saddle includes a contoured fabric surface with an underlying layer of soft gel. The gel may be molded to form embossment or imprinting in the fabric surface. A method of the invention includes the steps of disposing the saddle shell having a fabric sealed thereto, into a mold having a molding surface defining a desired contour and/or a desired pattern of embossment to be formed in the fabric. A thermoplastic gelable liquid is injected between the shell and the fabric. The fabric is contoured and or embossed by allowing the gelable liquid to cool while the shell is disposed in mold. The shell may be made of a foam material which is compressed into a desired shape and heat treated to form a shell having firmer, more dense portions and softer, less dense portions.

8 Claims, 3 Drawing Sheets

METHOD OF MANUFACTURING A CUSHION ARTICLE

The present invention relates to cushion articles and more specifically relates to a cushion article with an embossed fabric surface and method of manufacturing same.

A recent surge in a number of wrist and arm occupational injuries, resulting from repetitive computer keyboard use, has prompted the development of countless devices directed to alleviating this modern problem. "Carpal Tunnel Syndrome" has become a well known term describing a group of symptoms, including tendinitis, and epicondylitis, that occurs as a result of repetitive flexion of the wrist joints. Not only are the symptoms of Carpal Tunnel Syndrome extremely painful, they have the potential to become permanently debilitating. Fortunately, it has been found that if the causes of the disease are minimized or eliminated in time, further damage therefrom may be averted.

Wrist wraps, directed at immobilizing the wrist joint, and wrist supports, directed at propping the hand at a position which minimizes repetitive wrist flexion, have been heretofore developed. These devices are used extensively be data entry personnel and keyboard operators in order to prevent wrist and arm injuries.

The present invention is directed at an inexpensive method for manufacturing contoured cushions that may be used as highly effective, comfortable wrist supports. In a broad sense, the method may be used to produce cushions for other uses, for example, for textured foot rests.

A Method of Manufacturing a Gel Cushion is disclosed in U.S. Pat. No. 5,679,193, issued on Oct. 21, 1997, which is incorporated herein by this specific reference thereto. The present invention represents an improvement over U.S. Pat. No. 5,679,193 by providing a more economical, faster method of manufacturing a contoured gel cushion.

SUMMARY OF THE INVENTION

Accordingly, a cushion article and method of manufacture, is provided by the present invention. The method of the present invention generally comprises the steps of providing a shell, such as a molded polyurethane shell having a desired shape, providing a fabric having a size and shape suitable for covering at least a top surface of the shell and providing a mold having a molding surface defining a desired contour for a cushion article.

In addition, the method according to the invention includes the steps of sealing the fabric to the shell, disposing the shell having the fabric sealed thereto, into the mold such that the fabric faces the molding surface, and injecting a gelable between the shell and the fabric in order to force the fabric away from the shell and into intimate contact with the molding surface. In addition, the step of injecting a gelable medium may comprise providing an opening through the shell and injecting the gelable medium through the opening while the shell having the fabric sealed thereto is disposed in the mold.

Finally, the method of the present invention includes the steps of contouring the cushion article by allowing the gelable medium to gelate and bond with the fabric while the shell is disposed in the mold, and thereafter removing the completed contoured cushion article from the mold.

More specifically, the step of providing a mold comprises the step of providing a mold having a molding surface defining a desired pattern to be embossed into the cushion article and the step of contouring comprises the step of embossing the desired pattern into the fabric by allowing the gelable medium to gelate and bond with the fabric while the shell is disposed in the mold.

Importantly, the step of providing the shell may include the process of premolding the shell by providing a compressible foam and molding the compressible foam by compressing the foam while applying heat thereto in order to heat form the compressible foam into the desired shell shape. More particularly, by more substantially compressing a portion of the foam while less substantially compressing another portion of the foam and applying heat thereto, the foam may be molded into a shell having a shape defined by a firm, more compressed portion and a flexible, less compressed portion.

Even more particularly, the shell may be molded into a tray shape defined by a firm, more compressed rim and a flexible, less compressed interior. In this embodiment, the step of injecting a gelable medium comprises providing an opening through the less compressed interior of the shell and injecting the gelable medium through the opening such that the gelable medium will provide a layer of gel over the less compressed portion, softer portion of the foam shell. After the shell is so molded, the process of making the shell includes allowing the heat formed shell to cool and thereafter removing the shell having the desired shape from the shell mold.

In addition, the present invention provides a cushion article generally includes a shell having a desired shape and comprising a heat molded, compressed foam, a fabric disposed on the shell and sealed thereto, and gel means, injection molded between the shell and the fabric, for supporting the fabric in a desired contour.

Furthermore, the fabric and gel means may be disposed only on a portion of the shell, in order to form, for example, a wrist support, thereby leaving another portion of the shell exposed to function, for example, as a computer mouse pad holder.

BRIEF DESCRIPTION OF THE DRAWINGS

The features and advantages of the present invention will be more clearly understood with reference to the following detailed description, considered with the accompanying Drawings of which.

DETAILED DESCRIPTION

Figure 1:
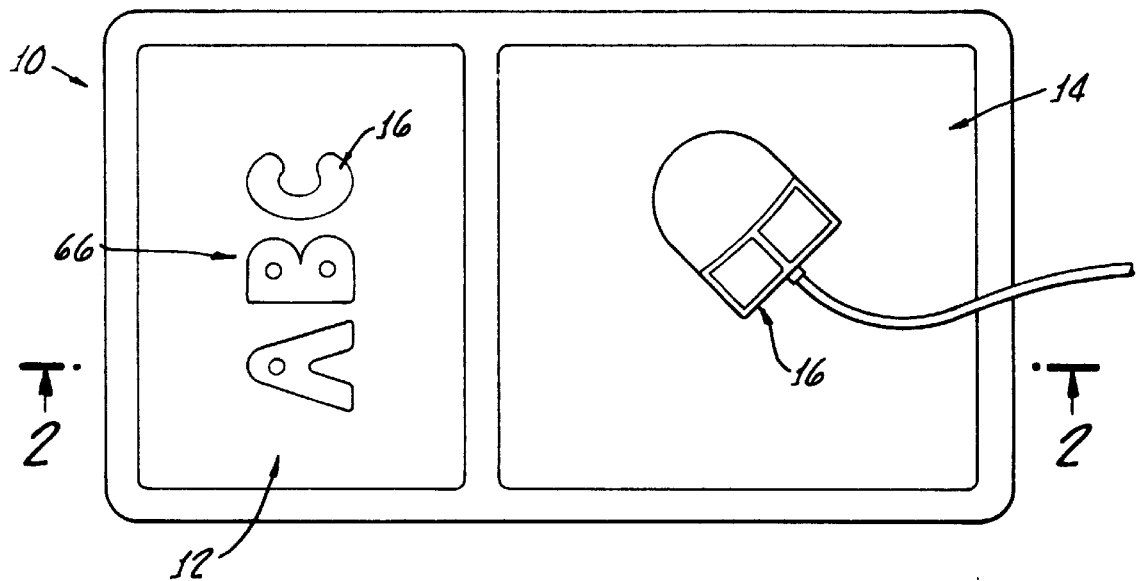
FIG. 1 shows a top plan view of an embodiment of a cushion article, in accordance with the present invention, said cushion article designed as combination wrist rest having a contoured, embossed fabric surface, and computer mouse pad.

Turning now to FIG. 1, a cushion article 10 in accordance with the present invention is shown. In this embodiment, the cushion article 10 may includes a wrist rest 12 and a pad 14 for supporting a computer mouse 16.

Figure 2:
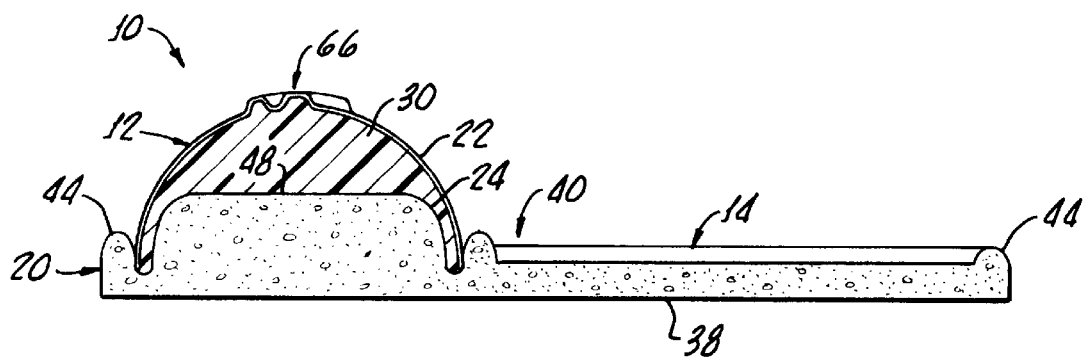
FIG. 2 shows a cross sectional view of the cushion article shown in FIG. 1, taken along line 2—2 thereof, showing a molded base, or shell, and gel means for supporting the fabric contour.

As shown more clearly in FIG. 2, the cushion article generally includes a shell 20, a fabric 22, film, or the like, disposed on the shell 20 and sealed thereto and having a size and shape suitable for covering a top surface or portion 24 of the shell 20, and gel means 30, molded between the shell 20 and the fabric 22, for supporting the fabric 22 in a desired contour.

More particularly, the fabric 22 may be comprised of, but is not limited to, a four way stretch fabric made of an elastomeric thread such as a segmented polyesterpolyurethane, like that sold under the trade name Lycra®, available from I. E. Dupont de Nemours and Company. It may also be a film.

As shown, the fabric 22 may be disposed on only a portion 36 of the shell 20, leaving another portion 38 of the shell 20 exposed. In this embodiment, the exposed portion 38 of the shell 20 may provide a well 40 for holding a computer mouse pad 14.

The gel means 30 is preferably comprised of a soft, easily molded composition. More particularly, the gel means 30 may comprise a thermoplastic compound having a low fluid viscosity at elevated temperatures that can be injection molded and thereafter cooled to produce a rubbery, elastic gel, for example a thermoplastic elastomer. It should be appreciated that the gel means 30 may alternatively comprise an injectable foam material or other resilient composition suitable for molding.

Preferably, the shell 20 is comprised of a compressible foam material, for example a polyurethane foam, which has been compressed and heat molded into the desired shape. Advantageously, by molding the shell 20 from a compressible foam, the shell may comprise both a firm, more dense portion, for example, a rim 44 of the shell 20, and a flexible, less dense portion, for example a soft bolster 48, or interior, which may be disposed, for example, beneath the gel means 30.

Alternatively, the shell 20 may comprise another rigid or semirigid material such as a molded plastic or the like. In this case, a foam member may be adhered to the plastic to form the bolster 48 if so desired.

By providing the soft foam bolster 48 beneath the gel means 30 in the wrist rest 12 as shown in FIGS. 1 and 2, the wrist rest 12 will have a comfortable, all gel "feel" even though the foam bolster 48 may constitute a substantial percentage of a volume of the wrist rest 12. This may be a significant consideration if the gel means 30 comprises a thermoplastic elastomer, which is typically more costly than the polyurethane foam which may make up the foam bolster 48.

FIGS. 1 and 2 also show another feature of the present invention, particularly, lettering, or other graphics 60 formed by the gel means 30. More particularly, the gel means 30 may provide means for supporting the fabric 22 in a desired pattern of embossment 66. The gel means 30, as will be discussed hereinafter, may be injection molded between the fabric 22 and the shell 20 such that the surface contour of the cushion article 10 may define a logo, lettering, a pattern, or other embossed form as desirable.

Notably, when an arm or wrist of a user, for example a computer operator (not shown) is rested on the wrist rest 12, the embossment 66 may become substantially compressed, due to a fluid-like softness of the gel means 30. Thus, the operator will typically not perceive embossed irregularities in the wrist rest 12. However, the highly resilient nature of the thermoplastic gel will cause the embossed pattern 66 to promptly reappear when the operator removes his arm or wrist from the article 10. It should also be appreciated that although a raised embossment 66 is shown, an imprinted embossment is also contemplated by the present invention.

Figure 3:
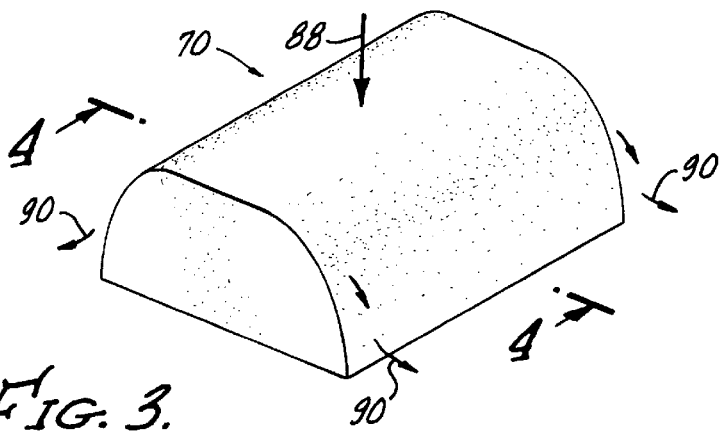
FIG. 3 shows another embodiment of a cushion article in accordance with the present invention wherein the shell is concealed beneath the gel means.
Figure 4:
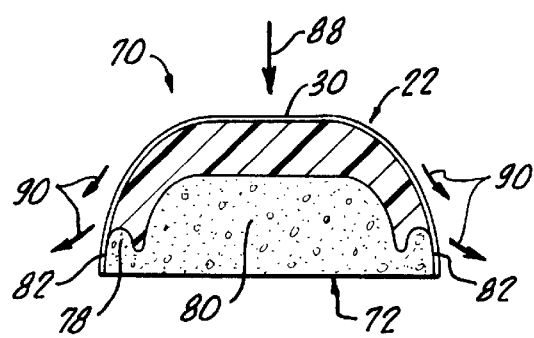
FIG. 4 shows a cross sectional view of the cushion article shown in FIG. 3, taken along line 4—4.

Another embodiment 70 of a cushion article in accordance with the present invention is shown in FIGS. 3 and 4. This cushion article 70, similar to the earlier described embodiment 10, includes a shell 72 which provides a base for the article 70, a fabric or film covering 22 and a gel means 30 for supporting the fabric or film 22 in a desired contour.

As shown in cross sectional view in FIG. 4, the shell 72 may include a dense, rigid rim 78 which may partially or totally surround a soft, flexible bolster 80. The fabric 22 is sealed to an outer perimeter 82 of the rim 78 and the gel means 30 provides a fluid-like layer overlying both the bolster 80 and rim 78.

The rim 78 functions in part to provide a rigid support to the cushion article 70. In addition, the rim 78 provides means for supporting and maintaining height and form of gel means 30 while pressure is being exerted against the cushion article and for reducing stresses on the gel means 30. More particularly, repeated use of the cushion 70 which causes pressure in a direction represented by arrow 88, will tend to force the gel means 30 downward and outward in a direction represented by arrows 90. However, the rim 78 may help to support the gel means 30 against such pressure and therefor increase the useful life of the cushion 70.

Figure 5:
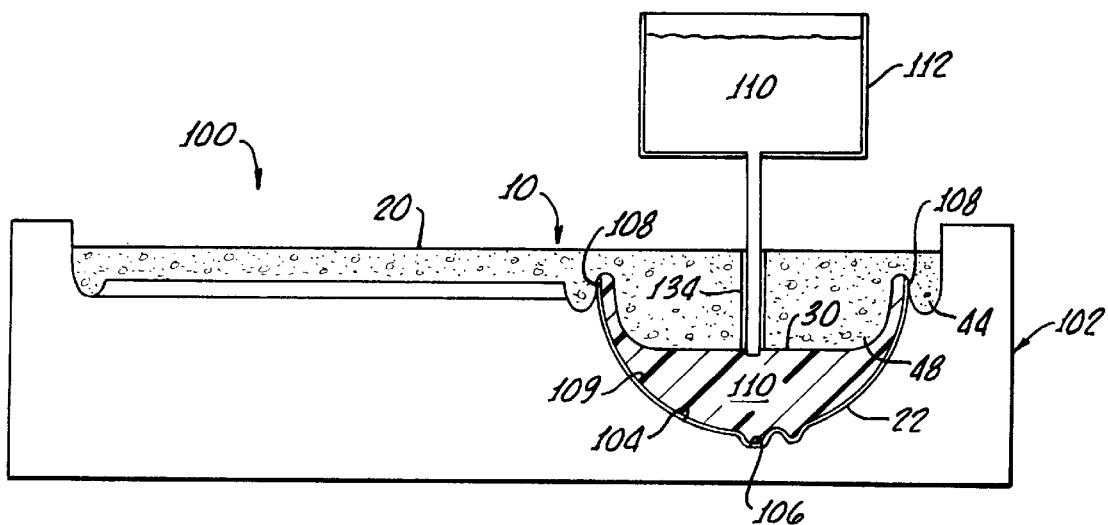
FIG. 5 shows the cross sectional view of the cushion article in FIG. 2 and in addition, shows a cross sectional view of apparatus suitable for manufacturing same.

Turning now to FIGS. 5, apparatus 100 suitable for making a cushion article, such as the cushion articles 10, 70, is shown. For the sake of clarity, a method in accordance with the invention will be described primarily with reference to the wrist rest and mouse pad combination cushion article 10 shown in FIGS. 1 and 2, although it will be appreciated that the method is not limited thereto and is suitable for manufacturing other type of cushion articles as well, such as the embodiment shown in FIGS. 3 and 4.

More particularly, a method the present invention generally includes the steps of providing a shell 20 and fabric 22, and providing a mold 102 having a molding surface 104 defining a desired contour for the cushion article 10. The molding surface 104 may include a desired pattern 106 for embossment in the cushion article 10.

The method further includes the steps of sealing the fabric 22 to the shell 20, and disposing the shell 20, having the fabric 22 sealed thereto into the mold 102 such that the fabric 22 faces the molding surface 104 as shown in FIG. 5. Clamps (not shown) or other means may provided for securing the cushion article 10 in the mold 100 during the molding process.

The fabric 22 is preferably heat sealed, ultrasonically or in any other suitable conventional manner, to the shell 20 along a perimeter 108 of the fabric 22, leaving an interior surface 109 of the fabric 22 detached therefrom. Adhesive attachment of the fabric 22 to the shell 20 is considered to be within the scope of the present invention but is preferably avoided in order that the manufacturing method be "environmentally friendly".

Next, a gelable medium 110 in fluid form, such as a thermoplastic gel, foam or other moldable, resilient material, provided from a medium source 112, is injected between the shell 20 and the fabric 22 in order to force the fabric 22 away from the shell and into intimate contact with the molding surface 104. The cushion article 10 is then contoured by allowing the gelable medium 110 to gelate and bond with the fabric 22 while the shell 20 is disposed in the mold 102, thus forming the resilient gel means 30.

In this step, the mold 102 is preferably cooled to hasten the molding process and to prevent penetration of the fluid gelable medium 110 through the fabric 22. This may be more clearly understood with reference to U.S. patent application Ser. No. 08/652,714 filed on May 30, 1996, entitled SEAMLESS GEL CUSHION AND METHOD OF MANUFACTURE, which is hereby incorporated by reference herein by this specific reference thereto.

After cooling, the contoured cushion article 10 may then be removed from the mold 102.

Figure 6A:
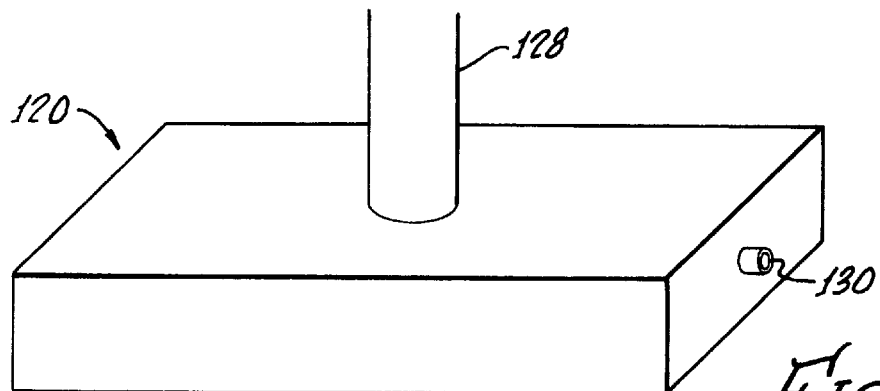
FIG. 6A shows a compressible foam suitable for the present invention.
Figure 6B:
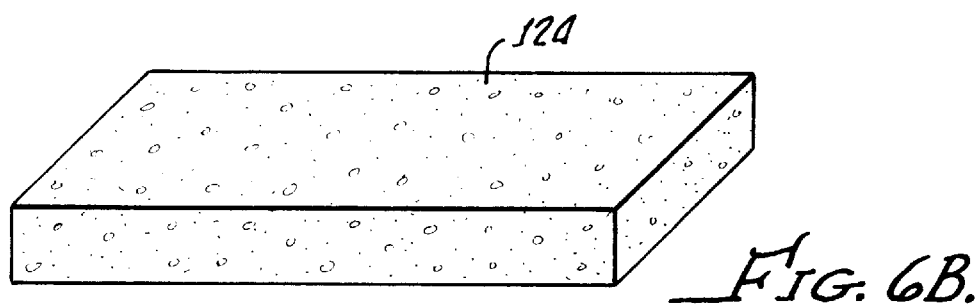
FIG. 6B shows apparatus suitable for compressing and molding the foam shown in FIG. 6A into the cushion article shell in FIG. 1, in which the shell includes a dense, firm rim and a less dense, soft bolster.
Figure 7:
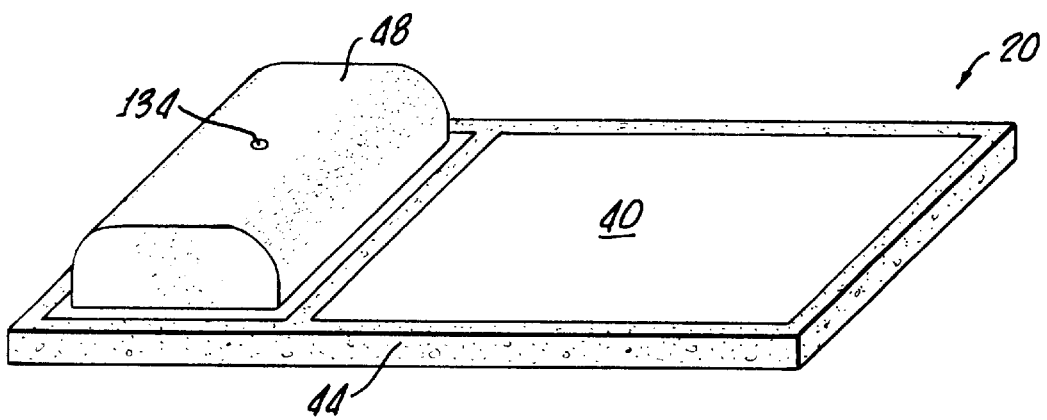
FIG. 7 shows a perspective view of a completed molded shell of FIG. 6, ready to use in the manufacture of the cushion article of FIG. 1.

Turning now to FIGS. 6 and 7, the step of providing the shell 20 may be comprised of molding a shell 20 having a desired shape. FIG. 7 shows shell 20 in perspective view, molded in accordance with this feature of the present invention.

More particularly, the step of providing a shell 20 may be comprised of providing a shell mold 120, providing a compressible foam, for example a urethane foam block 124 and molding the foam block 124 by compressing the foam 124 with the shell mold 120 and heating the shell mold 120 during the compressing in order to fix the compressed foam 124 into the desired shell shape. In other words, the foam block 124 may be compressed using any suitable means 128 for forcing the shell mold 120 against the foam block 124 while heating the foam block 124, for example by heating the shell mold 120 using a source of heat 130 connected thereto.

In general, any portion of the foam block 124 which is most compressed will become the more dense, firmest portion of the shell 20 while any less compressed, or uncompressed portion, will retain the less dense, soft, flexible properties of the original foam block 124. Thus, for example, a most compressed portion of foam 124 may make up the rim 44 and the mouse pad well 40. Similarly, a less compressed, or uncompressed portion of the foam 124 may make up the foam bolster 48.

It is also noted that in order to retain maximal softness of the bolster 48, little or no heat may be used in molding the bolster 48. Heat treatment may thus be restricted to, for example, the rim portion 44.

It will be appreciated that the particulars of such heat molding of the foam block 124, such as for example temperature and length of time for heating in order to fix the block 124 into the desired shape and firmness, will be understood by those skilled in the art, and thus details thereof are omitted herefrom.

The step of providing a shell 20 may further comprise the step of providing a shell 20 having a passage 134 therein in order to facilitate the step of injecting the gelable medium 30, such as shown in FIGS. 5 and 7.

The method of making a cushion article as described hereinabove is exceptionally economical and easy, and enables mass production of a variety of cushion articles in an environmentally friendly manner.

Although there has been hereinabove described a cushion article and a method of manufacturing same, in accordance with the present invention, for purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A method of making an article having a shell with a contoured cushion on a portion of a surface thereof, said method comprising the steps of:

providing a shell having a desired shape;

providing a fabric having a size and shape suitable for covering a portion of a top surface of the shell;

providing a mold having a molding surface defining a desired contour for the cushion;

sealing the fabric to the shell at that portion of the top surface where the cushion is to be formed;

disposing the shell having the fabric sealed thereto, in the mold such that the fabric faces the molding surface;

injecting a gelable medium between the shell and the fabric in order to force the fabric away from the shell and into intimate contact with the molding surface;

contouring the cushion by allowing the gelable medium to gelate and bond with the fabric while the shell is disposed in the mold; and removing the article having the contoured cushion from the mold.

2. The method according to claim 1 wherein the step of contouring the cushion article includes cooling the mold to prevent penetration of the gelable medium through the fabric.

3. The method according to claim 1 wherein the step of providing a mold comprises the step of providing a mold having a molding surface defining a desired pattern to be embossed into the cushion article and the step of contouring comprises the step of embossing the desired pattern into the fabric by allowing the gelable medium to gelate and bond with the fabric while the shell is disposed in the mold.

4. The method according to claim 1 wherein the step of providing a shell comprises providing a compressible foam, molding the compressible foam by compressing the foam while applying heat thereto in order to heat form the compressible foam into the desired shape, allowing the heat formed shell to cool and removing the shell having the desired shape from the mold.

5. The method according to claim 4 wherein the step of injecting a gelable medium comprises providing an opening through the shell and injecting the gelable medium through the opening while the shell having the fabric sealed thereto is disposed in the mold.

6. The method according to claim 1 wherein the step of providing a shell comprises the steps of providing a shell mold, providing a compressible foam, shaping the foam into a shell having a shape defined by a firm, more compressed portion and a flexible, less compressed portion, by more substantially compressing a portion of the foam while less substantially compressing another portion of the foam with the shell mold, and heating the shell mold during the compressing in order to fix the compressed foam into the desired shell shape.

7. The method according to claim 5 wherein the step of shaping the foam comprises shaping the foam into a shell having a tray shape defined by a firm, more compressed rim and a flexible, less compressed interior.

8. The method according to claim 7 wherein the step of injecting a gelable medium comprises providing an opening through the less compressed interior of the shell and injecting the gelable medium through the opening.

* * * * *